US012726529B2

(12) United States Patent
Bulgarella et al.

(10) Patent No.: US 12,726,529 B2
(45) Date of Patent: Sep. 1, 2026

(54) ESTABLISHING A CONNECTION IN A PACKET-SWITCHED COMMUNICATION NETWORK

(71) Applicant: Telecom Italia S.p.A., Milan (IT)

(72) Inventors: Fabio Bulgarella, Palermo (IT); Mauro Cociglio, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 274 days.

(21) Appl. No.: 18/576,475

(22) PCT Filed: Jul. 5, 2022

(86) PCT No.: PCT/EP2022/068641

§ 371 (c)(1),
(2) Date: Jan. 4, 2024

(87) PCT Pub. No.: WO2023/280881

PCT Pub. Date: Jan. 12, 2023

(65) Prior Publication Data

US 2024/0372900 A1 Nov. 7, 2024

(30) Foreign Application Priority Data

Jul. 9, 2021 (IT) ........................ 102021000018158

(51) Int. Cl.
*H04L 12/66* (2006.01)
*H04L 47/283* (2022.01)
(Continued)

(52) U.S. Cl.
CPC ........ *H04L 65/1069* (2013.01); *H04L 47/283* (2013.01); *H04L 69/28* (2013.01)

(58) Field of Classification Search
CPC ......... H04L 67/02; H04L 43/10; H04L 67/12; H04L 67/56; H04L 63/083; H04L 45/24;
(Continued)

(56) References Cited

U.S. PATENT DOCUMENTS 10,362,069 B2 * 7/2019 Skuratovich ........ H04L 65/1069
11,196,712 B1 * 12/2021 Norbutas ................ H04L 43/10
(Continued)

FOREIGN PATENT DOCUMENTS

WO 2010/118255 A2 10/2010
WO 2020/156996 A1 8/2020
(Continued)

OTHER PUBLICATIONS

Jiang et al., "Passive Estimation of TCP Round-Trip Times", ACM SIGCOMM Computer Communication Review, 2002, available at: https://www.cc.gatech.edu/fac/Constantinos.Dovrolis/Papers/rtt.pdf, 14 pages.

(Continued)

*Primary Examiner* — Kharye Pope
(74) *Attorney, Agent, or Firm* — XSENSUS LLP

(57) ABSTRACT

It is disclosed a method for establishing a connection between a first node and a second node of a packet-switched communication network, such as by means of a three-way handshake procedure. The first node transmits to the second node a first connection establishing packet; the second node, transmits to the first node a second connection establishing packet in response to reception of the first connection establishing packet; and the first node transmits to the second node a third connection establishing packet in response to reception of the second connection establishing packet, after a predefined wait time TW has lapsed since reception of the second connection establishing packet. The predefined wait time TW, randomly selected by the first node, prevents non authorized parties who might eavesdrop the connection establishing packets—typically non encrypted—from deriving information about the positions of the nodes during the connection establishment procedure.

10 Claims, 5 Drawing Sheets

(51) Int. Cl.
*H04L 65/1069* (2022.01)
*H04L 69/28* (2022.01)

(58) Field of Classification Search
CPC . H04L 63/0281; H04L 63/166; H04L 67/141; H04L 41/12; H04L 43/0817; H04L 67/63; H04L 67/01
See application file for complete search history.

(56) References Cited

U.S. PATENT DOCUMENTS

| | | | | |
|---|---|---|---|---|
| 11,196,833 | B1 * | 12/2021 | Norbutas | H04L 63/0272 |
| 11,632,326 | B1 * | 4/2023 | Hegar | H04L 45/28 709/238 |
| 2021/0409447 | A1 * | 12/2021 | Dutta | H04L 67/02 |
| 2022/0329508 | A1 * | 10/2022 | Joch | H04L 43/0882 |
| 2023/0009799 | A1 * | 1/2023 | Cociglio | H04L 1/203 |
| 2023/0394476 | A1 * | 12/2023 | Pagani | G06Q 20/3829 |

FOREIGN PATENT DOCUMENTS

| | | | |
|---|---|---|---|
| WO | 2020/260571 | A1 | 12/2020 |
| WO | 2021/105355 | A1 | 6/2021 |

OTHER PUBLICATIONS

Iyengar et al., “QUIC: A UDP-Based Multiplexed and Secure Transport”, Internet Engineering Task Force, RFC 9000, May 2021, pp. 1-151.

International Search Report and Written Opinion mailed on Nov. 2, 2022, received for PCT Application PCT/EP2022/068641, filed on Jul. 5, 2022, 09 pages.

* cited by examiner

ESTABLISHING A CONNECTION IN A PACKET-SWITCHED COMMUNICATION NETWORK

CROSS-REFERENCE TO RELATED APPLICATIONS

This application is a national stage application, filed under 35 U.S.C. § 371, of International Patent Application No. PCT/EP2022/068641, filed Jul. 5, 2022, which claims priority from Italian Patent Application No. 102021000018158, filed Jul. 9, 2021, the entire contents of each are incorporated herein by reference.

TECHNICAL FIELD

The present invention relates to the field of communication networks. In particular, the present invention relates to a method for establishing a connection in a packet-switched communication network. The present invention also relates to a node configured to perform such method and to a packet-switched communication network comprising such node.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

In order to guarantee privacy and data integrity of the packets exchanged between nodes, cryptographic protocols are known, such as TLS (Transport Layer Security), which are designed to prevent eavesdropping and tampering of the packets by encrypting them before they are transmitted.

In general, when two nodes establish a communication session, they agree a set of encryption parameters, which they will use for encrypting and decrypting the exchanged packets until the end of the communication session. Client-server transport layer (layer 4) network protocols such as QUIC (Quick UDP Internet Connections) and TCP (Transmission Control Protocol)+TLS in general provide for a connection establishing mechanism known as "three-way handshake", whereby the endpoints of the connection (client and server) authenticate each other and negotiate the encryption parameters, including the encryption key(s).

Hao Jiang et al.: "Passive Estimation of TCP Round-Trip Times", ACM SIGCOMM Computer Communication Review, 2002, retrieved at the following URL: https://www.cc.gatech.edu/fac/Constantinos.Dovrolis/Papers/rtt.pdf discloses that a three-way handshake for establishing a TCP connection in general is initiated by the caller X transmitting to the callee Y a first handshake packet, namely the packet SYN. The callee Y replies by transmitting to the caller X a second handshake packet, namely the packet SYN/ACK. The caller X replies by transmitting to the callee Y a third handshake packet, namely the packet ACK.

Upon completion of this three-way exchange of handshake packets between caller X and callee Y, both the endpoints know the encryption key(s). From that moment on, the endpoints will use the encryption key(s) to encrypt all the subsequently exchanged packets, which are accordingly protected against eavesdropping and tampering.

SUMMARY OF THE INVENTION

The Applicant has noticed that, though the known three-way handshake mechanism guarantees privacy and data integrity of the subsequently exchanged packets, the handshake packets themselves—being non encrypted—could be eavesdropped by unauthorized parties, which may derive therefrom privacy-sensitive information on the endpoints of the connection.

In particular, the Applicant has noticed that, since the handshake packets are not encrypted, an unauthorized party could identify reciprocally correlated handshake packets (namely, handshake packets belonging to a same handshake procedure carried out by a certain couple client-server). The unauthorized party may then obtain, for example, a rough measurement of the RTT (round trip time) between client and server as the time lapsing between detection times of the first and third handshake packets transmitted by the client to the server, as disclosed by the above mentioned paper by Hao Jiang et al. Such RTT measurement provides a rough indication of the distance between client and server. Based on such rough indication, the unauthorized party could determine the client's physical position and even the client's identity, thereby violating its privacy.

In view of the above, the Applicant has tackled the problem of providing a method for establishing a connection between two nodes of a packet-switched communication network, which prevents non authorized parties from deriving—during the connection establishment procedure—privacy-sensitive information about at least one of the nodes, in particular the one acting as client.

According to embodiments of the present invention, the above problem is solved by a method for establishing a connection between a first node and second node of a packet-switched communication network, wherein the first node transmits to the second node a first connection establishing packet; the second node transmits to the first node a second connection establishing packet in response to reception of the first connection establishing packet; and the first node transmits to the second node a third connection establishing packet in response to reception of the second connection establishing packet. Before transmitting the third connection establishing packet, the first node waits a predefined wait time $T_W$ since reception of the second connection establishing packet.

In the present description and in the claims, the expression "connection establishing packet" will designate a signaling packet transmitted during a procedure for establishing a connection, which comprises data allowing the nodes which transmit and receive such packet to agree a set of encryption parameters, including the encryption key(s) which the nodes will use to encrypt/decrypt all the packets that will be exchanged through the connection, once it is established. A connection establishing packet is therefore not encrypted, or at most it is encrypted using a key which is known or may be easily derived by unauthorized parties (e.g. the Destination Connection ID which, in the QUIC protocol, is written in plain text in the first handshake packet and is used as a key for encrypting at least part of the subsequent handshake packets).

This operation of the nodes advantageously prevents non authorized parties from deriving from the connection establishing packets privacy-sensitive information about the node (s) which applies the wait time $T_W$.

The first node initiates the establishment of a connection by transmitting to the second node a first connection establishing packet. For example, the first node and the second node may act as client and server of the connection to be established, which may be for example a QUIC connection. As the second node receives the first connection establishing packet, it transmits to the first node a second connection establishing packet in response thereto. As the first node receives the second connection establishing packet, it waits a wait time $T_W$ and then it transmits to the second node a third connection establishing packet.

A measurement point placed on the path of the connection establishing packets (namely, at an intermediate position or at any of the two nodes) may then detect the connection establishing packets. The measurement point may then calculate e.g. the RTT between the two nodes as the time lapsing between the detection times of the first and third connection establishing packets, decreased by the wait time $T_W$.

Advantageously, the measurement point is then capable of calculating a correct RTT value between the two nodes only if it knows the value of the wait time $T_W$. Hence, if a non authorized party places a measurement point on the path of the connection establishing packets, but the measurement point has no knowledge of the value of the wait time $T_W$ (or even of the fact that a wait time $T_W$ is applied), it may at most calculate the time lapsing between detection times of the first and third connection establishing packets, thereby obtaining an incorrect end-to-end RTT value which is affected by an error equal to the wait time $T_W$. Since the wait time $T_W$ is unknown, such error can not be compensated. The real reciprocal distance between the two nodes can not therefore be determined, and then any privacy-sensitive information relating to the nodes (in particular, their reciprocal distance) is advantageously protected.

According to a first aspect, the present invention provides a method for establishing a connection between a first node and a second node of a packet-switched communication network, the method comprising:

a) by the first node, transmitting to the second node a first connection establishing packet;

b) by the second node, transmitting to the first node a second connection establishing packet in response to reception of the first connection establishing packet; and c) by the first node, transmitting to the second node a third connection establishing packet in response to reception of the second connection establishing packet, wherein the first node transmits the third connection establishing packet in response to reception of the second connection establishing packet after a predefined wait time $T_W$ has lapsed since reception of the second connection establishing packet.

Preferably, the first connection establishing packet initializes the establishing of the connection between the first node and the second node.

Preferably, steps a), b) and c) are part of a three-way handshake procedure for establishing the connection between the first node and the second node.

Preferably, the value of the wait time $T_W$ is selected by the first node, the value of the wait time $T_W$ being unknown to parties non authorized by an entity managing the first node.

Preferably, the first node selects the value of the wait time $T_W$ in a random way from a predefined selection range.

Preferably, a probability density function of the value of the wait time $T_W$ in the predefined selection range is non uniform.

According to a preferred embodiment, the first node periodically changes the value of the wait time $T_W$.

Preferably, the first node changes the value of the wait time $T_W$ when it is assigned a new IP address.

Preferably, the first node runs more than one application establishing one or more connections with the second node, each one of the more than one application applying a same value of the wait time $T_W$.

According to a preferred embodiment, at step c) the first node performs, before the predefined wait time $T_W$ has lapsed, at least part of an operation of processing the received second connection establishing packet and generating the third connection establishing packet which will be transmitted after the predefined wait time $T_W$ has lapsed.

According to a second aspect, the present invention provides a node for a packet-switched communication network, the node being configured to establish a connection with a further node of the packet-switched communication network, the node being configured to:

transmit to the further node a first connection establishing packet, and in response to reception of a second connection establishing packet transmitted by the further node in response to reception of the first connection establishing packet, transmitting to the further node a third connection establishing packet, wherein the node is configured to transmit the third connection establishing packet in response to reception of the second connection establishing packet after a predefined wait time $T_W$ has lapsed since reception of the second connection establishing packet.

According to a third aspect, the present invention provides a packet-switched communication network comprising a first node and a second node configured to establish a connection between them, wherein:

the first node is configured to transmit to the second node a first connection establishing packet;

the second node is configured to transmit to the first node a second connection establishing packet in response to reception of the first connection establishing packet; and the first node is further configured to transmit to the second node a third connection establishing packet in response to reception of the second connection establishing packet, wherein the first node is configured to transmit the third connection establishing packet in response to reception of the second connection establishing packet after a predefined wait time $T_W$ has lapsed since reception of the second connection establishing packet.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
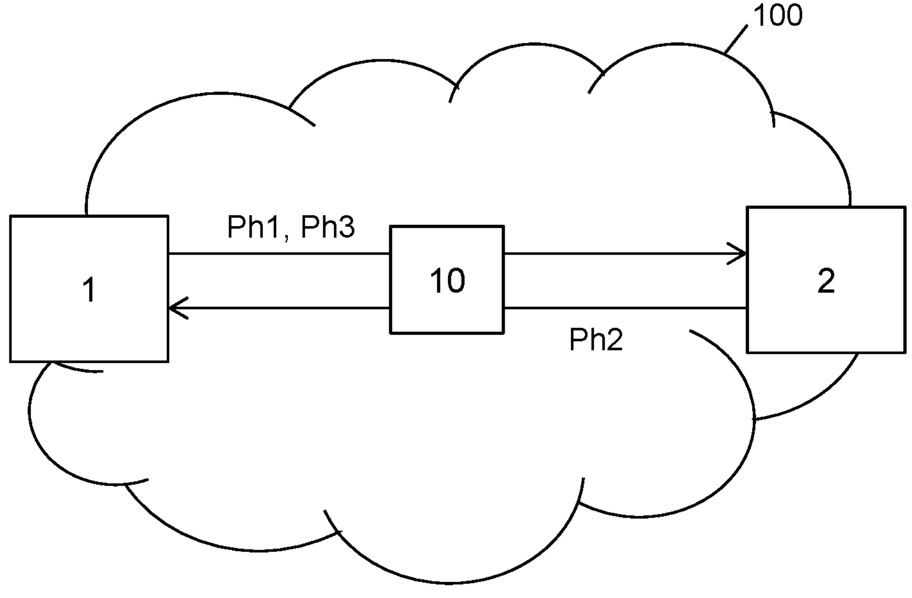
FIG. 1 schematically shows a packet-switched communication network in which the method for establishing a connection according to embodiments of the present invention is implemented.

FIG. 1 schematically shows a packet-switched communication network 100 comprising nodes configured to establish a connection according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

In order to establish a connection between them, the nodes 1, 2 are configured to perform an exchange of connection establishing packets. For example, such exchange of connection establishing packets may include a three-way handshake procedure whereby the nodes exchange three connection establishing packets, namely a first connection establishing packet Ph1 initiating the three-way handshake and two further connection establishing packets Ph2, Ph3 transmitted in response to reception of a preceding connection establishing packet Ph1, Ph2. Specifically:

- the node 1 is configured to initiate the establishment of the connection with the node 2 by transmitting to the node 2 the first connection establishing packet Ph1;
- the node 2 is configured to, in response to reception of the first connection establishing packet Ph1, transmit to the node 1 a second connection establishing packets Ph2; and
- the node 1 is configured to, in response to reception of the second connection establishing packet Ph2, transmit to the node 2 a third connection establishing packets Ph3.

The connection establishing packets Ph1, Ph2, Ph3 carry data allowing the nodes 1, 2 to reciprocally authenticate and agree a set of encryption parameters including the encryption key(s), which they will use for encrypting and decrypting the packets which they will exchange subsequently, until the end of the communication session.

For example, if the connection being established is a TCP+TLS connection with the node 1 acting as client and the node 2 acting as server, the first connection establishing packet Ph1 is the packet TCP SYN, the second connection establishing packet Ph2 is the packet TCP SYN/ACK and the third connection establishing packet Ph3 is the packet TCP ACK. As a second example, if the connection being established is a QUIC connection with the node 1 acting as client and the node 2 acting as server, the packets Ph1, Ph2 and Ph3 are those provided by the 1-RTT mechanism described by J. Iyengar et al.: "QUIC: A UDP-Based Multiplexed and Secure Transport", chapter 7.1, IETF RFC 9000, May 2021.

Figure 2:
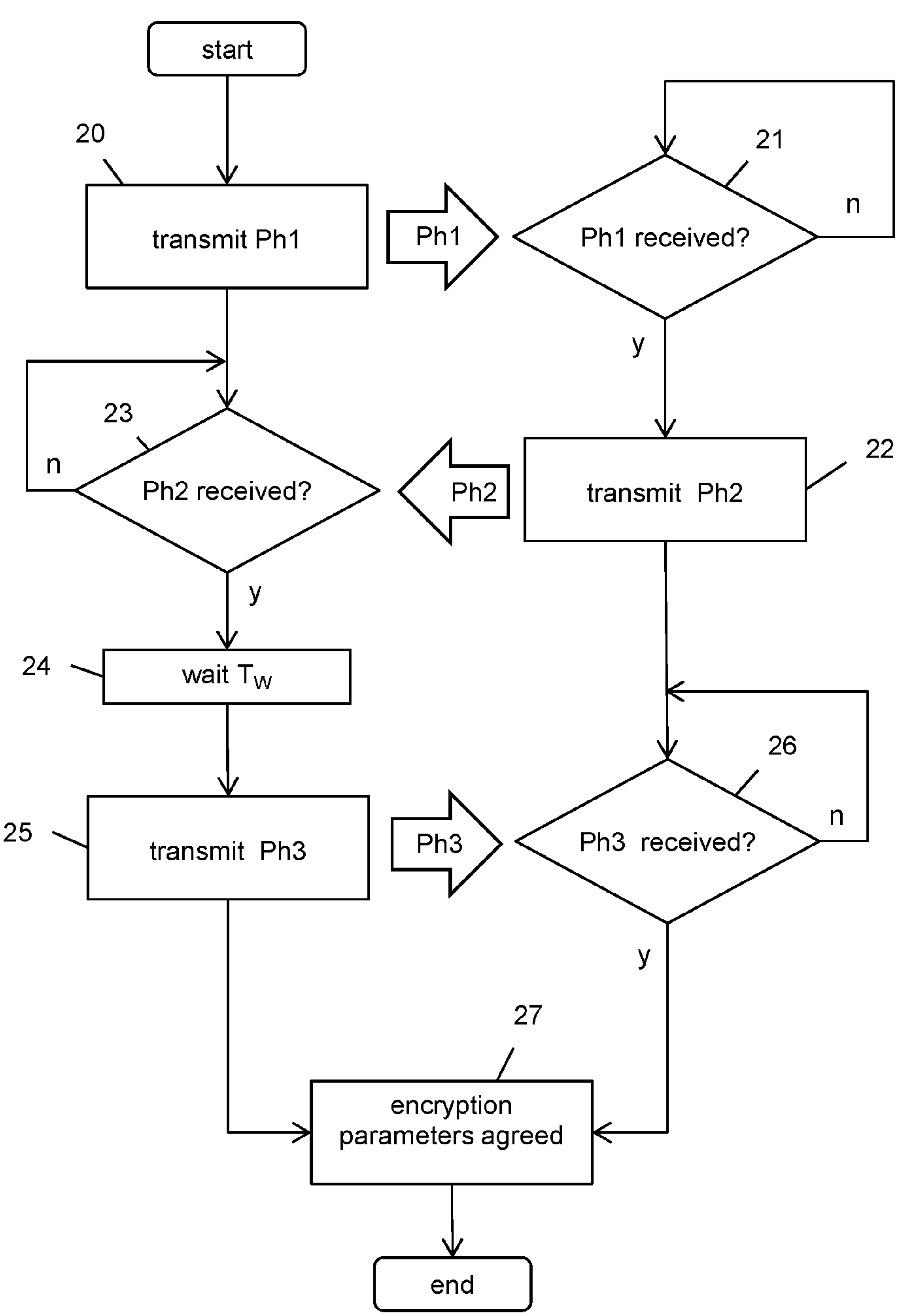
FIG. 2 is a flow chart of the operation of two nodes of the communication network of FIG. 1, according to an embodiment of the present invention.

With reference now to the flow chart of FIG. 2, the operation of the nodes 1, 2 will be described in further detail. If the nodes 1, 2 are the endpoints for example of a QUIC connection, the node 1 may be the one acting as client of the QUIC connection, while the node 2 may be the one acting as server of the QUIC connection.

The node 1 preferably initiates the establishment of a connection with the node 2 by transmitting thereto the first connection establishing packet Ph1 (step 20).

The node 2 waits for reception of possible connection establishing packets initiating the establishment of connections with other nodes of the network 100 (step 21). As the node 2 receives the first connection establishing packet Ph1 from the node 1, in response thereto it preferably transmits to the node 1 the second connection establishing packet Ph2 (step 22).

After transmission of the first connection establishing packet Ph1, the node 1 preferably waits for reception of the second connection establishing packet Ph2 from the node 2 (step 23). As the node 1 receives the second connection establishing packet Ph2 from the node 2, it preferably enters a waiting status whose duration is equal to a wait time $T_W$ (step 24).

In particular, at step 24 the node 1 starts a local timer counting the wait time $T_W$. The wait time $T_W$ is preferably selected by the node 1 and is known only by the node 1. Preferably, the node 1 selects the value of the wait time $T_W$ in a random way. According to a particularly preferred embodiment, the value of the wait time $T_W$ is randomly selected by the node 1 in a predefined selection range, for example 0 ms to 19 ms.

According to a preferred embodiment, the node 1 periodically changes the value of the wait time $T_W$. For example, the node 1 may select a new random value of the wait time $T_W$ each time the node 1 is assigned a new IP address. According to a variant, the probability density function in the predefined selection range of $T_W$ is non uniform (e.g. the probability of the range lower values may be higher than the probability of the range higher values or vice versa). This further increases the security of the mechanism, as it will be explained in further detail herein below.

Preferably, in case the node 1 runs more than one application, each application establishing one or more connections with the node 2, all these applications preferably apply a same value of the wait time $T_W$.

After the wait time $T_W$ has lapsed, the node 1 preferably transmits to the node 2 the third connection establishing packet Ph3 (step 25).

It may be appreciated that the processing of the second connection establishing packet Ph2 and the generation of the third connection establishing packet Ph3 may be at least partially performed by the node 1 at step 24, namely before the wait time $T_W$ is lapsed. However, the node 1 waits lapse of the wait time $T_W$ before transmitting the third connection establishing packet Ph3, even if its generation is completed before. Alternatively, the node 1 may start the processing of the second connection establishing packet Ph2 and the generation of the third connection establishing packet Ph3 after the wait time $T_W$ has lapsed.

Still alternatively, the node 1 may start the processing of the second connection establishing packet Ph2 and the generation of the third connection establishing packet Ph3 upon reception of the second connection establishing packet Ph2 from the node 2, and then start the timer counting the wait time $T_W$ when the generation of the third connection establishing packet Ph3 is completed. In any case, the third connection establishing packet Ph3 will be transmitted after the wait time $T_W$ has lapsed.

After transmission of the second connection establishing packet Ph2, the node 2 preferably waits for reception of the third connection establishing packet Ph3 from the node 1 (step 26). As the node 2 receives the third connection establishing packet Ph3 from the node 1, the three-way handshake is completed and both the nodes 1, 2 have information to define an agreed set of encryption parameters including the encryption key(s) (step 27), which they will use for encrypting and decrypting the packets which they will exchange subsequently, until the end of the communication session.

This operation of the nodes 1, 2 advantageously prevents non authorized parties from deriving from the connection establishing packets Ph1, Ph2, Ph3 privacy-sensitive information about the node 1 which applies the wait time $T_W$, as it will be discussed in detail with reference to FIGS. **3*a*-3*c***.

Figure 3A:
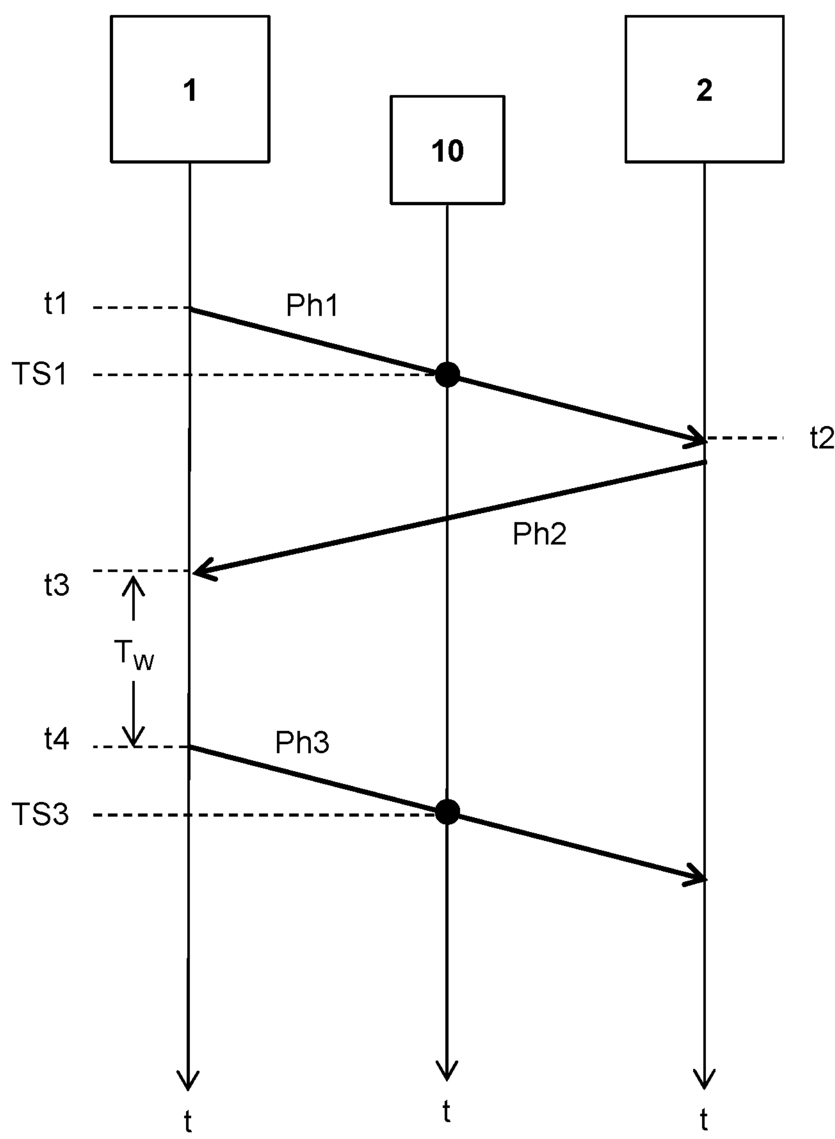
FIGS. 3*a*-3*c* show three exemplary scenarios which might occur in the communication network of FIG. 1.

With reference first to FIG. 3*a*, at time t1 the node 1 initiates the establishment of a connection by transmitting the first connection establishing packet Ph1 to the node 2 (step 20).

At time t2, the node 2 receives the first connection establishing packet Ph1 and, in response thereto, it transmits to the node 1 the second connection establishing packet Ph2 (step 22). The transmission time of the second connection establishing packet Ph2 is delayed relative to the reception time t2 of the first connection establishing packet Ph1 by a maximum time E2, which depends on the processing time of the first connection establishing packet Ph1 and generation time of the second connection establishing packet Ph2 at the node 2.

Then, at time t3, the node 1 receives the second connection establishing packet Ph2 and enters a waiting status whose duration is equal to a wait time $T_W$ (step 24). While in the waiting status, the node 1 may perform at least part of the processing of the received second connection establishing packet Ph2 and the generation of the third connection establishing packet Ph3.

Then the wait time $T_W$ lapses and, at time t4, the node 1 transmits to the node 2 the third connection establishing packet Ph3 (step 25). If the node 1 performs whole processing of the second connection establishing packet Ph2 and generation of the third connection establishing packet Ph3 before the wait time $T_W$ has lapsed, the third connection establishing packet Ph3 is ready for transmission when the wait time $T_W$ lapses, and hence the time t4 substantially coincides with the lapse of the wait time $T_W$. Otherwise, the time t4 may be delayed relative to lapse of the wait time $T_W$. This may happen if the processing of the second connection establishing packet Ph2 and generation of the third connection establishing packet Ph3 is performed at least partially after the wait time $T_W$ has lapsed, as it may happen if—for example—the time E1 for processing the second connection establishing packet Ph2 and generating the third connection establishing packet Ph3 is longer than the wait time $T_W$.

In this case, the third connection establishing packet Ph3 is substantially transmitted upon lapse of a time E1 (longer than the wait time $T_W$) since reception of the second connection establishing packet Ph2.

In the scenario of FIG. 3*a*, it is assumed that a single measurement point 10 is placed on the path of the connection establishing packets Ph1, Ph2, Ph3 (namely, at an intermediate position or at any of the two nodes 1, 2). Assuming that the measurement point 10 is capable of detecting the packets transmitted from the node 1 to the node 2, at time TS1 the measurement point 10 detects the first connection establishing packet Ph1 and at time TS3 it detects the third connection establishing packet Ph3. As apparent from FIG. 3*a*, the end-to-end RTT (namely, the RTT between the nodes 1 and 2) between the nodes 1 and 2 is the time TS3–TS1 lapsing between the detections of the first and third connection establishing packets Ph1, Ph3, decreased by the wait time $T_W$.

The measurement point 10 is then capable of calculating a correct end-to-end RTT value between the two nodes 1 and 2 only if it knows the value of the wait time $T_W$. In that case, the measurement point 10 may calculate the correct value of the end-to-end RTT as:

$$RTT_{E2E} = (TS3 - TS1) - Tw \qquad [1]$$

Otherwise, if the measurement point 10 is placed on the path of the bidirectional packet flow Pk, Pk' by a non authorized party who has no knowledge of the wait time $T_W$ (or even of the fact that a wait time $T_W$ is applied by the node 1), it may at most calculate the difference TS3–TS1, thereby obtaining an incorrect end-to-end RTT measurement affected by an error equal to the wait time $T_W$. Since the wait time $T_W$ is unknown, such error can not be compensated.

The real reciprocal distance between the nodes 1, 2 can not therefore be determined, and then any privacy-sensitive information relating to the nodes 1, 2 (in particular, their reciprocal distance) is advantageously protected.

It may be appreciated that, in principle, the unauthorized party could infer an estimate of the wait time $T_W$, for example by calculating the value of $RTT_{E2E}$ for several communication sessions set up between the nodes 1 and 2 and by calculating an average of such values. If the minimum value $T_{Wmin}$ and maximum value $T_{Wmax}$ of the range from which the wait time $T_W$ is selected are known (e.g. 0 ms and 19 ms), an estimate of the wait time $T_W$ could be obtained e.g. by subtracting $(T_{Wmin}+T_{Wmax})/2$ from the average $RTT_{E2E}$. Periodically changing the minimum value $T_{Wmin}$ and/or the maximum value $T_{Wmax}$, and/or using a non uniform probability density function in the selection range of $T_W$ and/or periodically changing the probability density function advantageously obviates this drawback.

Further, as disclosed above, the transmission time t4 of the third connection establishing packet Ph3 may coincide with the lapse of the wait time $T_W$, or it may be delayed relative to it. Hence, equation [1] may be reformulated in more general terms as:

$$RTT_{E2E} = (TS3 - TS1) - (t4 - t3) \qquad [1']$$

with $(t4-t3)\geq T_W$. If the node 1 starts processing the second connection establishing packet Ph2 and generating the third connection establishing packet Ph3 at time t3 and the processing and generation time E1 is longer than the wait time $T_W$, then (t4–t3) is equal to E1. An unauthorized party capable of estimating E1 could then calculate the correct value of the end-to-end RTT by applying equation [1'], even if it does not know the value of $T_W$. In order to minimize this risk, the value of the wait time $T_W$ is preferably selected longer than E1 (for example, the probability density function in the predefined selection range of $T_W$ is such that the probability of the range higher values is higher than the probability of the range lower values). Alternatively, the processing of the second connection establishing packet Ph2 and generation the third connection establishing packet Ph3 is started only after the wait time $T_W$ has lapsed. In this latter case, the value of the wait time $T_W$ is preferably selected as short as possible (for example, the probability density function in the predefined selection range of $T_W$ is such that the probability of the range lower values is higher than the probability of the range higher values). This guarantees that (t4–t3) is not equal to the processing and generation time E1.

Figure 3B:
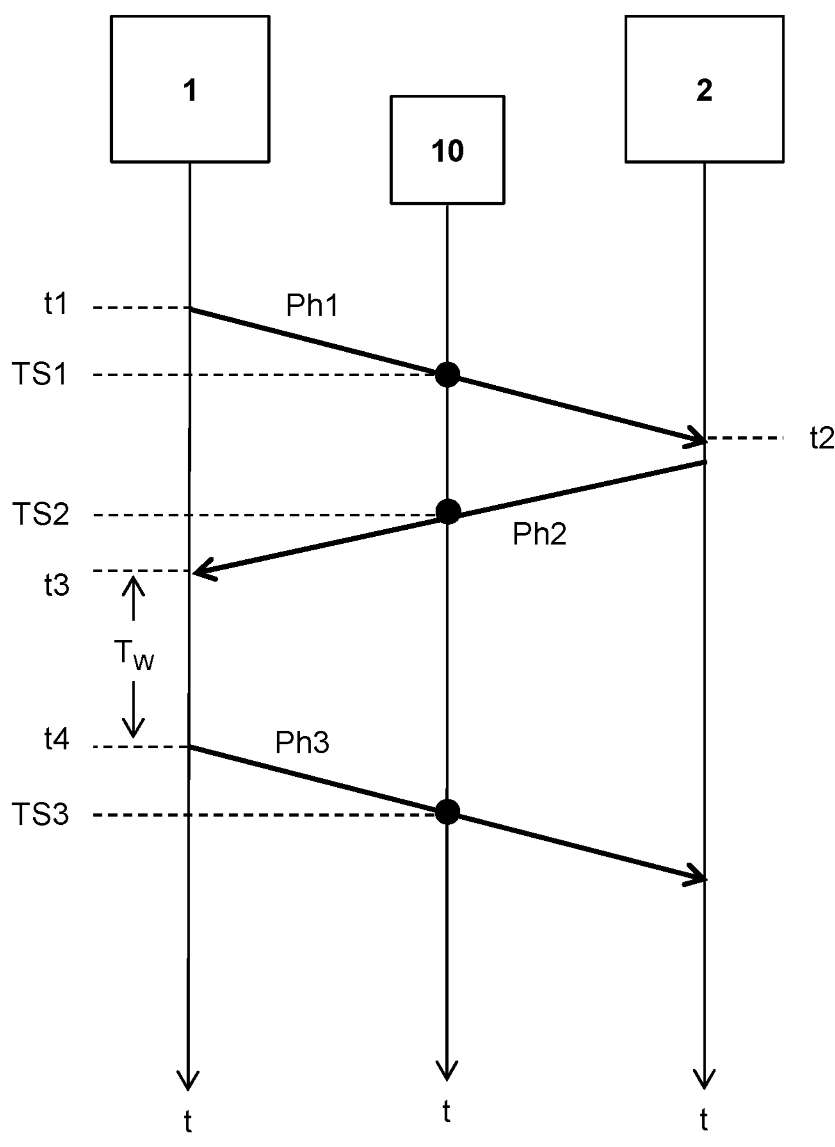

With reference to FIG. 3*b*, it is now assumed that the measurement point 10 is capable of detecting both packets transmitted from the node 1 to the node 2 and packets transmitted from the node 2 to the node 1. In this case, as described above the measurement point 10 detects the first connection establishing packet Ph1 and the third connection establishing packet Ph3 at times TS1 and TS3, respectively. In addition, at time TS2, the measurement point 10 also detects the second connection establishing packet Ph2. As apparent from FIG. 3*b*, the time TS2-TS1 lapsing between detection of the first connection establishing packet Ph1 and detection of the second connection establishing packet Ph2 is the right-hand RTT (namely, the RTT between measurement point 10 and node 2, also termed "upstream RTT", if the node 2 acts as the server of the end-to-end connection between node 1 and node 2).

The measurement point 10 may then calculate the value of the right-hand RTT as:

$$RTT_R = (TS2 - TS1) \quad [2]$$

It is to be noted that the measurement point 10 is capable of calculating a correct right-hand RTT value even if it doesn't know the value of the wait time $T_W$. From such measurement, the measurement point 10 may then derive a rough indication of the relative distance between itself and the node 2, which enables it to obtain a rough indication of the position of the node 2.

Advantageously, the privacy of the node 1 however still continues being protected also in this case.

As apparent from FIG. 3*b*, indeed, the left-hand RTT (namely, the RTT between the node 1 and the measurement point 10, also termed "downstream RTT", if the node 1 acts as the client of the end-to-end connection between node 1 and node 2) is the time TS3–TS2 lapsing between detection of the second connection establishing packet Ph2 and detection of the third connection establishing packet Ph3, decreased by the wait time $T_W$.

The measurement point 10 is then capable of calculating a correct left-hand RTT value (short of the delays E1, E2 introduced by the nodes 1, 2, as discussed above) only if it knows the value of the wait time $T_W$. In that case, the measurement point 10 may calculate the value of the left-hand RTT as:

$$RTT_L = (TS3 - TS2) - T_W \quad [3]$$

Otherwise, if the measurement point 10 is placed on the path of the bidirectional packet flow Pk, Pk' by a non authorized party who has no knowledge of the wait time $T_W$ (or even of the fact that a wait time $T_W$ is applied by the node 1), it may at most calculate the difference TS3–TS2, thereby obtaining an incorrect left-hand RTT value affected by an error equal to the wait time $T_W$. Since the wait time $T_W$ is unknown, such error can not be compensated. The real reciprocal distance between the node 1 and the measurement point 10 can not therefore be determined, and then any privacy-sensitive information relating to the node 1 (in particular, its distance from the measurement point 10) is still advantageously protected.

The privacy of the node 1 continues being protected also in case more than one measurement point is placed on the path of the connection establishing packets Ph1, Ph2, Ph3.

Figure 3C:
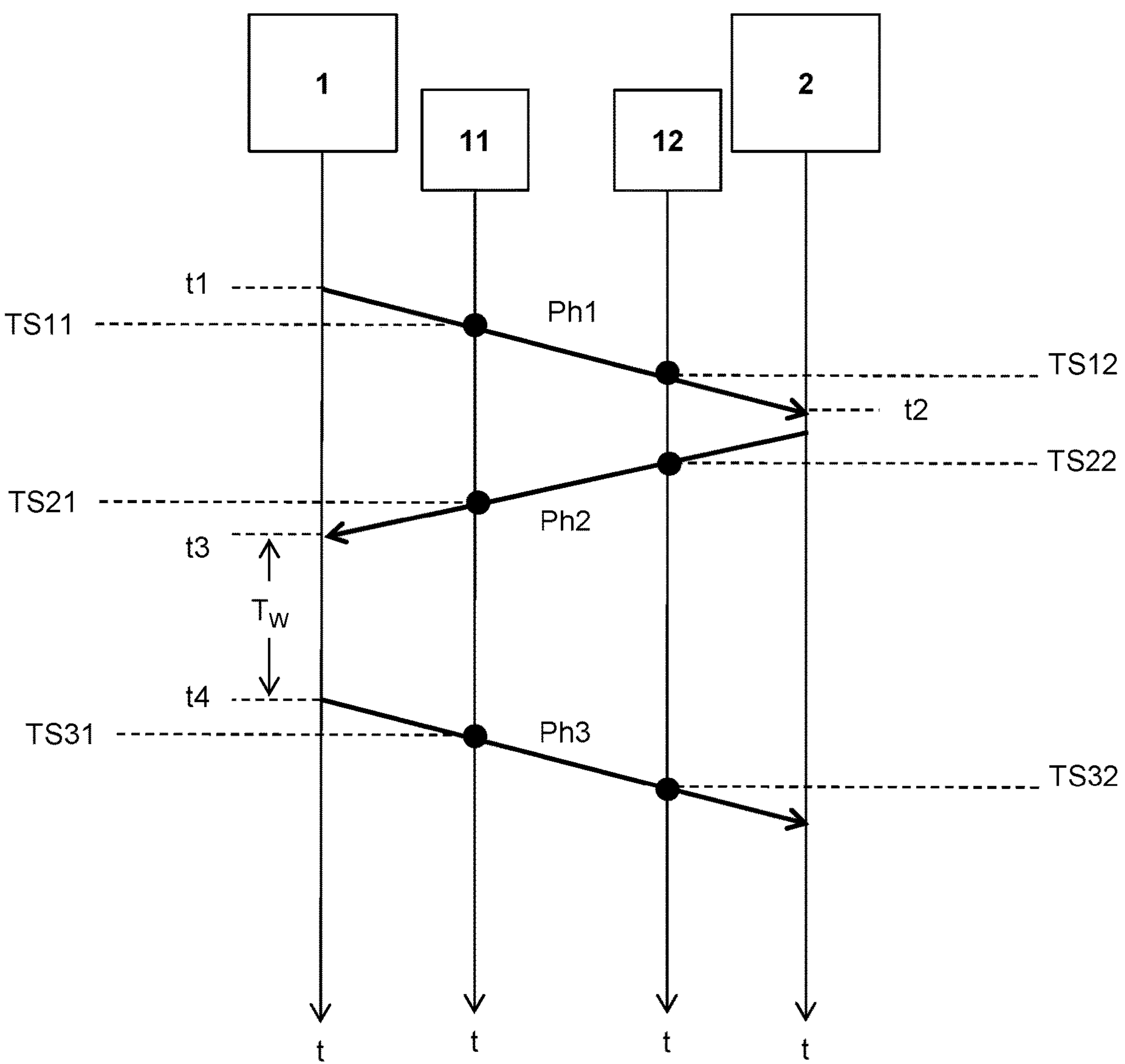

In the scenario of FIG. 3*c*, it is assumed that two measurement points 11, 12 are placed on the path of the connection establishing packets Ph1, Ph2, Ph3 (namely, at an intermediate position or at any of the two nodes 1, 2).

Assuming that each one of the measurement points 11, 12 is capable of detecting both packets transmitted from the node 1 to the node 2 and packets transmitted from the node 2 to the node 1, the first connection establishing packet Ph1 is detected by the measurement point 11 at time TS11 and by the measurement point 12 at time TS12; the second connection establishing packet Ph2 is detected by the measurement point 11 at time TS21 and by the measurement point 12 at time TS22; and the third connection establishing packet Ph3 is detected by the measurement point 11 at time TS31 and by the measurement point 12 at time TS32.

From the above detection times, the following RTT values may be calculated:

- end-to-end RTT ($RTT_{E2E}$), calculated as either the time TS31-TS11 lapsing between detections of the connection establishing packets Ph1 and Ph3 by the measurement point 11, decreased by the wait time $T_W$; or calculated as the time TS32-TS12 lapsing between detections of the connection establishing packets Ph1 and Ph3 by the measurement point 12, decreased by the wait time $T_W$;
- right-hand RTT between measurement point 11 and node 2 ($RTT_{R1}$), calculated as the time TS21-TS11 lapsing between detections of the connection establishing packets Ph1 and Ph2 by the measurement point 11;
- right-hand RTT between measurement point 12 and node 2 ($RTT_{R2}$), calculated as the time TS22-TS12 lapsing between detections of the connection establishing packets Ph1 and Ph2 by the measurement point 12;
- left-hand RTT between node 1 and measurement point 11 ($RTT_{L1}$), calculated as the time TS31-TS21 lapsing between detections of the connection establishing packets Ph2 and Ph3 by the measurement point 11, decreased by the wait time $T_W$; and
- left-hand RTT between node 1 and measurement point 12 ($RTT_{L2}$), calculated as the time TS32-TS22 lapsing between detections of the connection establishing packets Ph2 and Ph3 by the measurement point 12, decreased by the wait time $T_W$ It may be appreciated that only the right-hand values $RTT_{R1}$ and $RTT_{R2}$ are independent of the wait time $T_W$, while the end-to-end value $RTT_{E2E}$ and the left-hand value $RTT_{L1}$ and $RTT_{L2}$ are all dependent on the wait time $T_W$. The correct values of $RTT_{E2E}$, $RTT_{L1}$ and $RTT_{L2}$ (short of the delays E1, E2 introduced by the nodes 1, 2, as discussed above) may then be calculated only by authorized parties having a knowledge of the value of $T_W$, while non authorized parties having no knowledge of the value of $T_W$ will provide incorrect values affected by an error equal to $T_W$, which they won't be capable to compensate. Any privacy-sensitive information on the node 1 derivable from the distance of the node 1 from the node 2 and/or from the measurement point 11 and/or from the measurement point 12 then continues being protected also in this case.

It has to be noted that the left-hand values $RTT_{L1}$ and $RTT_{L2}$ could be indirectly calculated. For example, $RTT_{L1}$ may be calculated as a difference between $RTT_{E2E}$ and $RTT_{R1}$ and, similarly, $RTT_{L2}$ may be calculated as a difference between $RTT_{E2E}$ and $RTT_{R2}$. It may be appreciated however that also the results of such indirect calculation are dependent on $T_W$. Hence, no correct value of the left-hand RTT may be calculated indirectly, and hence the privacy of the node 1 continues being protected.

Another indirect measurement which may be obtained is the RTT between the measurement points 11 and 12, namely $RTT_{1\text{-}2}$. This may be calculated as either $RTT_{R1}$-$RTT_{R2}$, or $RTT_{L2}$-$RTT_{L1}$. It may be appreciated that both the results obtained for $RTT_{1\text{-}2}$ are independent of $T_W$. While indeed both $RTT_{R1}$ and $RTT_{R2}$ are independent of $T_W$ (and hence also their difference is independent of $T_W$), $RTT_{L1}$ and $RTT_{L2}$ depend on $T_W$, but such dependence is compensated when the difference between $RTT_{L2}$ and $RTT_{L1}$ is calculated.

Hence, based on the left-hand and right-hand values provided by the measurement points 11, 12, a correct RTT measurement may be provided between the measurement points 11, 12, even without having any knowledge of the value of the wait time $T_W$, or even of the fact that a wait time $T_W$ is applied by the node 1.

Though in the above description it has been assumed that the node 1 applies the wait time $T_W$, according to other embodiments the node 2 may instead apply the wait time $T_W$ before transmission of the second connection establishing packet Ph2 in response to reception of the first connection establishing packet Ph1. In that case, all the considerations set forth above in connection to the node 1 and the protection of privacy-sensitive information relating thereto apply to the node 2. In that case, indeed, only left-hand RTT values are independent of $T_W$, while end-to-end RTT values and right-hand RTT values which may be obtained by either a single measurement point or more measurement points placed between the nodes 1 and 2 are dependent of $T_W$.

According to other embodiments, both the nodes 1 and 2 apply respective wait times $T_{W1}$ and $T_{W2}$ before transmission of the respective connection establishing packets Ph3 and Ph2. Each node 1, 2 may select its own value of the wait time $T_{W1}$ and $T_{W2}$ independently from each other. In that case, privacy-sensitive information relating to both nodes 1, 2 are advantageously protected, because all the end-to-end, right-hand and left-hand RTT values which might be obtained by one or more measurement points placed between the nodes 1 and 2 are dependent of $T_{W1}$ and/or $T_{W2}$. In this case, only RTT values between intermediate measurement points may be calculated correctly by unauthorized party having no knowledge of the values of the wait times $T_{W1}$ and $T_{W2}$. Such measurements are indeed independent of the values of the wait times $T_{W1}$ and $T_{W2}$, as discussed above in connection with FIG. 3*c*.

Though, in the above description, reference has been made to a situation where the wait time $T_{W1}$ is applied to transmission of the third connection establishing packet Ph3, this is not limiting. If the third connection establishing packet Ph3 is followed by a fourth connection establishing packet transmitted by the node 2 in response to reception of the third connection establishing packet Ph3, the wait time $T_W$ could by applied by the node 2 to transmission of such fourth connection establishing packet. In case the fourth connection establishing packet is at least partially non encrypted, this advantageously prevents non authorized parties from correlating such fourth connection establishing packet with the second connection establishing packet Ph2 and, based on their detection times, calculating the RTT between the nodes 1, 2, from which privacy-sensitive information on the nodes 1 and 2 could be derived.

The invention claimed is:

1. A method for establishing a connection between a first node and a second node of a packet-switched communication network, said method comprising:

a) by said first node, transmitting to said second node a first connection establishing packet;

b) by said second node, transmitting to said first node a second connection establishing packet in response to reception of said first connection establishing packet; and c) by said first node, transmitting to said second node a third connection establishing packet in response to reception of said second connection establishing packet, wherein said first node obfuscates an end-to-end round trip time (RTT) of communication between the first node and the second node by transmitting said third connection establishing packet in response to reception of said second connection establishing packet after a predefined wait time $T_W$ has lapsed since reception of said second connection establishing packet, and the predefined wait time $T_W$ is unknown to parties not authorized by an entity managing said first node and is a value chosen at random from a preselection range.

2. The method according to claim 1, wherein said first connection establishing packet initializes said establishing of said connection between the first node and said second node.

3. The method according to claim 1, wherein said steps a), b) and c) are part of a three-way handshake procedure for establishing said connection between said first node and said second node.

4. The method according to claim 1, wherein a probability density function of said value of said wait time $T_W$ in said predefined selection range is non uniform.

5. The method according to claim 1, wherein said first node periodically changes the value of said wait time $T_W$.

6. The method according to claim 1, wherein said first node changes the value of said wait time $T_W$ when it is assigned a new IP address.

7. The method according to claim 1, wherein said first node runs more than one application establishing one or more connections with said second node, each one of said more than one application applying a same value of said wait time $T_W$.

8. The method according to claim 1, wherein at step c) said first node performs, before said predefined wait time $T_W$ has lapsed, at least part of an operation of processing said received second connection establishing packet and generating said third connection establishing packet which will be transmitted after said predefined wait time $T_W$ has lapsed.

9. A node for a packet-switched communication network, said node being configured to establish a connection with a further node of said packet-switched communication network, said node being configured to:

transmit to said further node a first connection establishing packet; and in response to reception of a second connection establishing packet transmitted by said further node in response to reception of said first connection establishing packet, transmitting to said further node a third connection establishing packet, wherein said node is configured to obfuscates an end-to-end round trip time (RTT) of communication between the said node and said further node by transmitting said third connection establishing packet in response to reception of said second connection establishing packet after a predefined wait time $T_W$ has lapsed since reception of said second connection establishing packet, and the predefined wait time $T_W$ is unknown to parties not authorized by an entity managing said first node and is a value chosen at random from a preselection range.

10. A packet-switched communication network comprising a first node and a second node configured to establish a connection between them, wherein:

said first node is configured to transmit to said second node a first connection establishing packet;

said second node is configured to transmit to said first node a second connection establishing packet in response to reception of said first connection establishing packet; and said first node is further configured to transmit to said second node a third connection establishing packet in response to reception of said second connection establishing packet, wherein said first node is configured to obfuscate an end-to-end round trip time (RTT) of communication between the first node and the second node by transmitting transmit said third connection establishing packet in response to reception of said second connection establishing packet after a predefined wait time $T_W$ has lapsed since reception of said second connection establishing packet, and the predefined wait time $T_W$ is unknown to parties not authorized by an entity managing said first node and is a value chosen at random from a preselection range.

* * * * *